(12) United States Patent
Tamir et al.

(10) Patent No.: US 11,474,879 B2
(45) Date of Patent: *Oct. 18, 2022

(54) EXTENDING BERKELEY PACKET FILTER SEMANTICS FOR HARDWARE OFFLOADS

(71) Applicant: Intel Corporation, Santa Clara, CA (US)

(72) Inventors: Eliezer Tamir, Bait Shemesh (IL); Johannes Berg, Detmold (DE); Andrew Cunningham, Ennis (IE); Peter Waskiewicz, Jr., Portland, OR (US); Andrey Chilikin, Limerick (IE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/032,623

(22) Filed: Sep. 25, 2020

(65) Prior Publication Data

US 2021/0019197 A1 Jan. 21, 2021

Related U.S. Application Data

(63) Continuation of application No. 16/933,121, filed on Jul. 20, 2020, which is a continuation of application
(Continued)

(51) Int. Cl.
*G06F 9/50* (2006.01)
*G06F 9/48* (2006.01)
(Continued)

(52) U.S. Cl.
CPC .......... *G06F 9/5088* (2013.01); *G06F 9/4411* (2013.01); *G06F 9/4843* (2013.01); *G06F 9/5027* (2013.01); *G06F 9/5044* (2013.01); *H04L 45/74* (2013.01); *H04L 47/23* (2013.01); *H04L 49/30* (2013.01);
(Continued)

(58) Field of Classification Search
CPC .... G06F 9/4411; G06F 9/4843; G06F 9/5027; G06F 9/5044; G06F 2209/509; H04L 45/74; H04L 63/0236; H04L 69/22
See application file for complete search history.

(56) References Cited

U.S. PATENT DOCUMENTS

| | | |
|---|---|---|
| 7,689,702 B1 | 3/2010 | Tripathi et al. |
| 2004/0243723 A1 | 12/2004 | Davis et al. |

(Continued)

OTHER PUBLICATIONS

Extended European Search Report for Patent Application No. 19182455.6, dated Dec. 12, 2019, 10 pages.
(Continued)

*Primary Examiner* — Dong U Kim
(74) *Attorney, Agent, or Firm* — Essential Patents Group, LLP.; Christopher K. Gagne

(57) ABSTRACT

Examples include registering a device driver with an operating system, including registering available hardware offloads. The operating system receives a call to a hardware offload, inserts a binary filter representing the hardware offload into a hardware component and causes the execution of the binary filter by the hardware component when the hardware offload is available, and executes the binary filter in software when the hardware offload is not available.

20 Claims, 15 Drawing Sheets

Related U.S. Application Data

No. 16/058,773, filed on Aug. 8, 2018, now Pat. No. 10,754,707.

(51) Int. Cl.

| | |
|---|---|
| *H04L 69/22* | (2022.01) |
| *H04L 47/10* | (2022.01) |
| *G06F 9/4401* | (2018.01) |
| *H04L 49/00* | (2022.01) |
| *H04L 45/74* | (2022.01) |
| *H04L 9/40* | (2022.01) |

(52) U.S. Cl.
CPC ...... *H04L 63/0209* (2013.01); *H04L 63/0236* (2013.01); *H04L 63/0245* (2013.01); *H04L 69/22* (2013.01); *G06F 2209/509* (2013.01)

(56) References Cited

U.S. PATENT DOCUMENTS

| | | | |
|---|---|---|---|
| 2005/0122980 | A1 | 6/2005 | Anand et al. |
| 2007/0156919 | A1* | 7/2007 | Potti ............... H04L 63/08 709/238 |
| 2008/0126622 | A1 | 5/2008 | Tamir et al. |
| 2008/0271134 | A1 | 10/2008 | Johnson et al. |
| 2009/0089351 | A1 | 4/2009 | Belgaied et al. |
| 2009/0141634 | A1 | 6/2009 | Rothstein et al. |
| 2010/0131669 | A1 | 5/2010 | Srinivas et al. |
| 2013/0227556 | A1 | 8/2013 | Tsirkin et al. |
| 2013/0235868 | A1 | 9/2013 | Owens et al. |
| 2013/0254436 | A1 | 9/2013 | Chhabra et al. |
| 2017/0346933 | A1 | 11/2017 | Pope et al. |
| 2018/0288198 | A1 | 10/2018 | Pope et al. |
| 2018/0321963 | A1* | 11/2018 | Amit ............... G06F 21/53 |
| 2019/0140983 | A1 | 5/2019 | Tu et al. |
| 2019/0306109 | A1 | 10/2019 | Masputra et al. |
| 2019/0325302 | A1 | 10/2019 | Savic et al. |
| 2020/0028785 | A1* | 1/2020 | Ang ............... G06F 9/45558 |

OTHER PUBLICATIONS

Notice of Allowance for U.S. Appl. No. 16/058,773, dated Apr. 13, 2020.
Fleming, M. "A thorough introduction to eBPF", https://lwn.net/Articles/740157; Dec. 2, 2017; (year: 2017).
Corrected Notice of Allowability for U.S. Appl. No. 16/058,773, dated Jun. 17, 2020.
Extended European Search Report for European Patent Application No. 20208788.8, dated May 17, 2021.
Extended European Search Report for European Patent Application No. 20208791.2, dated May 20, 2021.
Invitation pursuant to Rule 63 for European Patent Application No. 20208788.8, dated Feb. 17, 2021.
Invitation pursuant to Rule 63 for European Patent Application No. 20208791.2, dated Feb. 17, 2021.
Non-Final Office Action for U.S. Appl. No. 16/058,773, dated Mar. 10, 2020.
Notice of Allowance for U.S. Appl. No. 16/058,773, dated Apr. 27, 2020.
Office Action for European Patent Application No. 19182455.6, dated Dec. 9, 2020.
Kumar, K., et al., "sNICh: Efficient last hop networking in the data center", Architectures for Networking and Communications Systems (ANCS), 2010.
Office Action for U.S. Appl. No. 16/933,121, dated Jan. 7, 2022.
Summons to Attend Oral Proceedings for European Patent Application No. 19182455.6, dated Feb. 10, 2022.

\* cited by examiner

700

EXTENDING BERKELEY PACKET FILTER SEMANTICS FOR HARDWARE OFFLOADS

BACKGROUND

In digital communications networks, packet processing refers to the wide variety, of techniques that are applied to a packet of data or information as it moves through the various network elements of a communications network. There are two broad classes of packet processing techniques that align with the standardized network subdivisions of control plane and data plane. The techniques are applied to either control information contained in a packet which is used to transfer the packet safely and efficiently from origin to destination or the data content (frequently called the payload) of the packet, which is used to provide some content-specific transformation or take a content-driven action. Within any network enabled device (e.g. router, switch, firewall, network element or terminal such as a computer or smartphone) it is the packet processing subsystem that manages the traversal of the multi-layered network or protocol stack from the lower, physical and network layers all the way through to the application layer.

Packet processing systems often apply packet filter rules (PFRs) (also known as Internet Protocol (IP) filter rules) to examine incoming; packets. The packet filter examines the header of each packet based on a specific set of rules, and on that basis decides to allow the packet to pass through the filter (called an Accept/Pass Action) or prevent the packet from passing through (called a Drop Action). Packet filters have a significant impact on performance, both throughput and latency, since typically multiple PFRs are checked for every received packet on an interface before the packet is forwarded or terminated. Scaling up the number of rules and/or the rule complexity also significantly impacts performance.

One way to implement PFRs is by using a software-based library executing on one or more processor cores of a computing platform. The Berkeley Packet Filter (BPF), invented in 1992 by Steven McCanne and Van Jacobson has become the de-facto standard mechanism for packet filtering in most of UNIX™ and Linux™ operating systems (OS). The BPF was used in the original Tcpdump and LibPCAP implementations to efficiently select which packets are to be taken from a packet stream. The basic idea is that a set of filter rules is compiled into bytecode that is then applied to each inspected packet to decide whether the packet is passed or ignored. The BPF allowed for constructing high level PFRs such as "only pass packets from example.com with the tcp destination port X" and having them compiled to run efficiently.

Recently the Linux™ kernel implementation was extended BPF and moved out of network subsystem code. One change was the addition of "maps" which are basically key-value sets that allow keeping of state information between packet inspection events and passing of state information back to the user.

The BPF implementation has its own virtual machine which runs bytecode generated by a BPF compiler, as well as just-in-time (JIT) compilers from bytecode to native code. Some network device manufacturers (such as Netronome, available at www.netronome.com) have started to offer BPF offload in silicon. With the expected development of fully offloaded BPF/BPF hardware, extensions to the BPF semantics are needed to be able to seamlessly integrate them into Linux™. It would greatly increase the utility of BPF programs if BPF programs could access HW registers and offload engines. Currently there is no consistent way to offer these resources for consumption by the BPF kernel programs.

DETAILED DESCRIPTION

As contemplated in the present disclosure, the semantics for accessing hardware resources for BPFs are implemented in a consistent manner for use across many devices.

Figure 1:
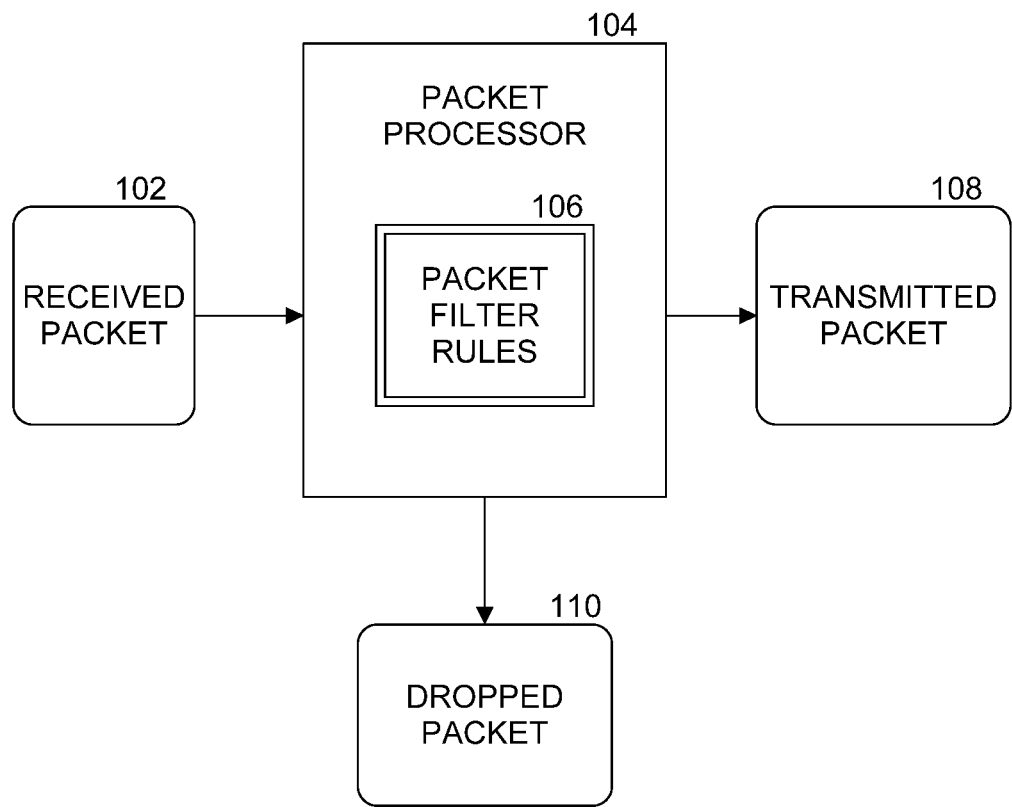
FIG. 1 illustrates an example of a packet processing system.

FIG. 1 illustrates an example of a packet processing system. A packet includes a packet header and a packet payload. A packet processor component 104 (which may be implemented in software or hardware) examines a received packet 102 by applying one or more packet filter rules 106 (PFRs) to one or more of the packet header and packet payload. Based on application of the PFRs, packet processor 104 either transmits the packet (e.g., as transmitted packet 108) onward in a computing system for further processing or drops the packet (shown as dropped packet 110 in FIG. 1) whereby the packet is discarded and deleted, resulting in no further processing of the dropped packet. PFRs 106 may include many types of rules, such as range filtering rules, anti-spoof rules, smurf/Internet Control Message Processing (ICMP) rules, blacklist rules, white list rules, fragment rules, port forwarding rules, policy-based routing rules, mechanisms to classify which queue needs to receive the packet, and so on.

Figure 2:
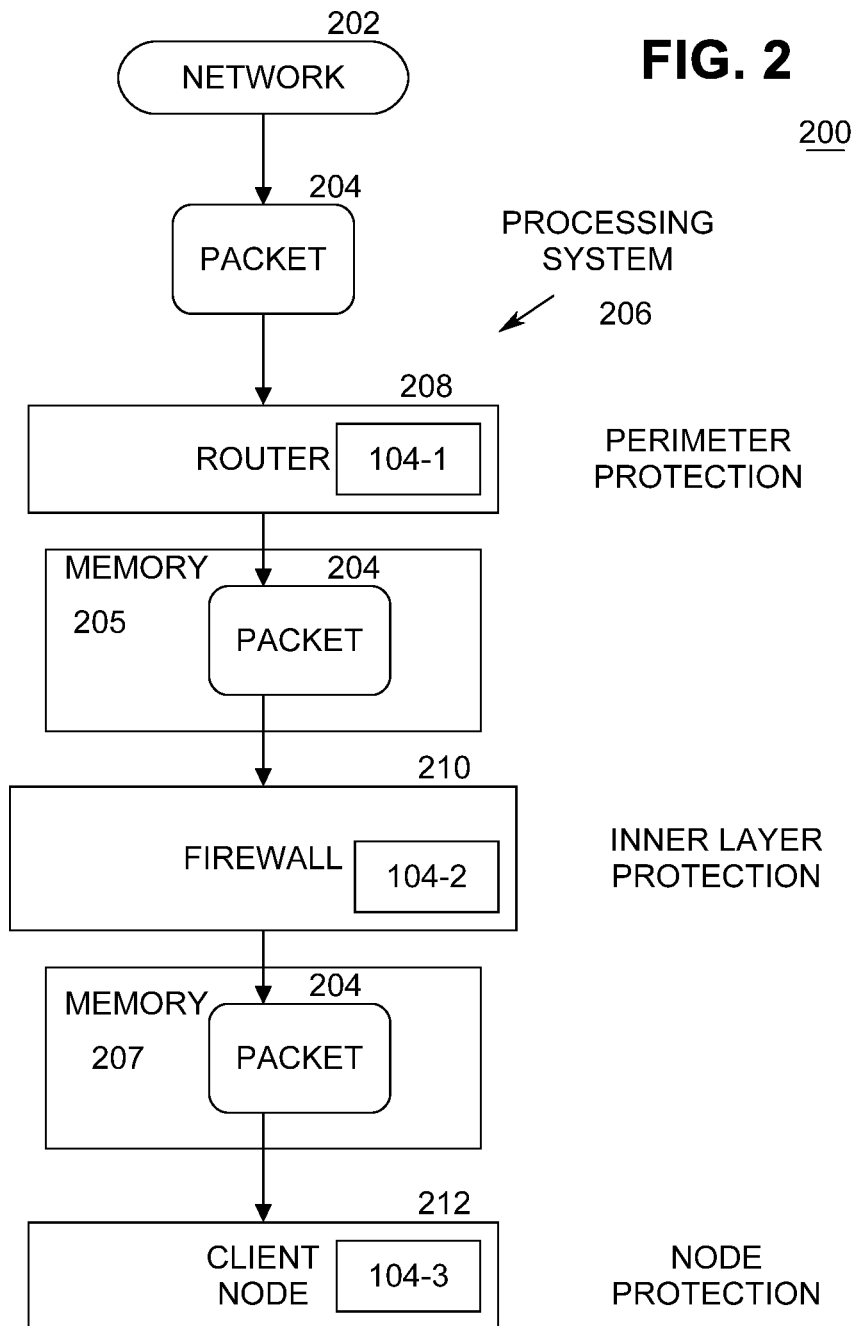
FIG. 2 illustrates an example of packet processing components in a computing platform.

FIG. 2 illustrates an example of packet processing components in a computing platform. An incoming packet 204 is received from a network 202, such as the Internet, for example, by processing system 206. Processing system 206 may be any digital electronics device capable of processing data. Processing system 206 includes one or more components that processes packet 204.

For example, processing system 206 includes router 208. Router 208 is a networking device that forwards data packets between computer networks. Routers perform the traffic directing functions on the Internet. A data packet is typically forwarded from one router to another router through the networks that constitute an internetwork until it reaches its destination node. A router is connected to two or more data lines from different networks. When a data packet comes in on one of the lines, the router reads the network address information in the packet to determine the ultimate destination. Then, using information in its routing table or routing policy, it directs the packet to the next network on its journey. The most familiar type of routers are home and small office routers that simply forward Internet Protocol (IP) packets between the home computers and the Internet. An example of a router would be the owner's cable or ISI, router, which connects to the Internet through an Internet service provider (ISP). More sophisticated routers, such as enterprise routers, connect large business or ISP networks up to the powerful core routers that forward data at high speed along the optical fiber lines of the Internet backbone.

In an embodiment, router 208 includes packet processor 104-1 (i.e., an instantiation of packet processor 104). Router 208 provides perimeter protection. Router 208 forwards packet 204 to firewall 210 if the packet passes the PFRs applied by packet processor 104-1 in the router. In an embodiment, packet 204 is stored, at least temporarily, in memory 205. In some embodiments, memory 205 is included in router 208. In another embodiment, route 208 may be replaced by a switch.

For example, processing system 200 also includes firewall 210. Firewall 210 is a network security system that monitors and controls incoming and outgoing network traffic based on predetermined security rules. A firewall typically establishes a barrier between a trusted internal network and untrusted external network, such as the Internet. Firewalls are often categorized as either network firewalls or host-based firewalls. Network firewalls filter traffic between two or more networks. Host-based firewalls run on host computers and control network traffic in and out of those machines.

In an embodiment, firewall 210 includes packet processor 104-2. Firewall 210 provides inner layer protection. Firewall 210 forwards packet 204 to client node 212 if the packet passes the PFRs applied by packet processor 104-2 in the firewall. Note that the set of PFRs applied by packet processor 104-2 in firewall 210 may be different than the set of PFRs applied by packet processor 104-1 in router 208. In an embodiment, packet 204 is stored, at least temporarily, memory 207. In an embodiment, memory 205 and memory 207 may be the same memory. In some embodiments, memory 207 is included in firewall 210.

For example, processing system 200 also includes client node 212. Client node 212 may be a computing system such as a laptop or desktop personal computer, smartphone, tablet computer, digital video recorder (DVR), computer server, web server, consumer electronics device, or other content producer or consumer.

In an embodiment, client node 212 includes packet processor 104-3. Client node 212 provides node protection. Note that the set of PFRs applied by packet processor 104-3 in client node 212 may be different than the set of PFRs applied by either packet processor 104-1 in router 208 or packet processor 104-2 in firewall 210.

Although router 208, firewall 210, and client node 212 are all shown in the example processing system 206 in a pipeline design, packet processor 104 according to the present disclosure may be included "stand-alone" in processing system 206, or in any combination of zero or more of router 208, firewall 210, client node 104, or in other components in processing system 206. In the example shown in FIG. 2, once packet processor 104-1 in router 208, packet processor 104-2 in firewall 210, and packet processor 104-3 in client node 212 all examine and pass the packet, then client node 212 can use the packet's payload for further processing in the client node. In various embodiments, packet processors 104-1, 104-2, 104-3, router 208, firewall 210, and client node 212 are implemented by one or more of hardware circuitry, firmware, and software, including network virtualized functions (NVFs).

Figure 3:
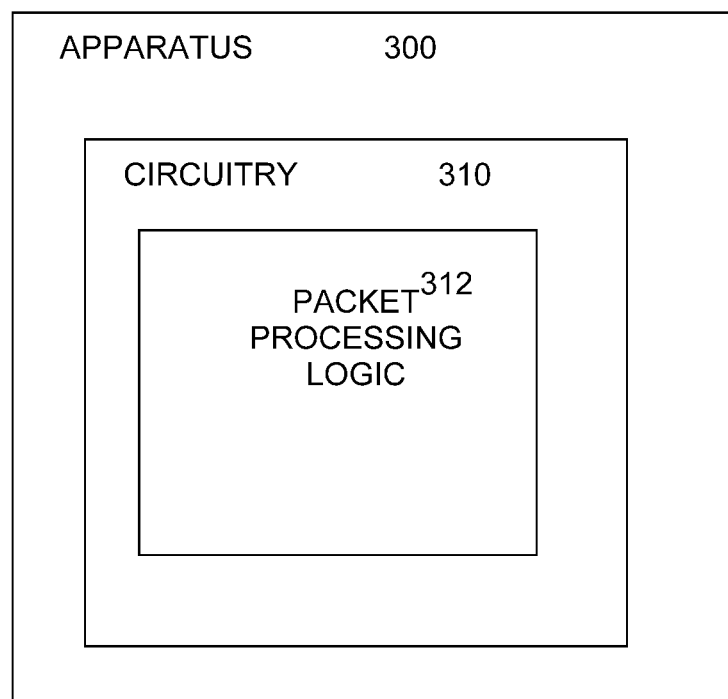
FIG. 3 illustrates an example apparatus.

FIG. 3 illustrates an example apparatus. Although apparatus 300 shown in FIG. 3 has a limited number of elements in a certain topology, it may be appreciated that the apparatus 300 may include more or less elements in alternate topologies as desired for a given implementation.

According to some examples, apparatus 300 is associated with logic and/or features of packet processing logic 312. In an embodiment, packet processing logic 312 is implemented as packet processor 104 as shown in FIG. 1, and/or packet processor 104-1, 104-2, and 104-3 as shown in FIG. 2, hosted by a processing system such as processing system 206, and supported by circuitry 310. Packet processing logic 312 applies packet filter rules 106 to received packet 102. For these examples, circuitry 310 is incorporated within one or more of circuitry, processor circuitry, a processing element, a processor, a central processing unit (CPU) or a core maintained at processing system 206. Circuitry 310 is arranged to execute one or more software, firmware or hardware implemented modules, components or packet processing logic 312. Module, component or logic may be used interchangeably in this context. The examples presented are not limited in this context and the different variables used throughout may represent the same or different integer values. Also, "logic", "module" or "component" also includes software/firmware stored in computer-readable media, and although the types of logic are shown in FIG. 3 as discrete boxes, this does not limit these components to storage in distinct computer-readable media components (e.g., a separate memory, etc.).

Circuitry 310 is all or at least a portion of any of various commercially available processors, including without limitation an Intel® Atom®, Celeron®, Core (2) Duo®, Core i3, Core i5, Core i7, Itanium®, Pentium®, Xeon®, Xeon Phi® and XScale® processors; or similar processors, or Advanced Reduced Instruction Set Computing (RISC) Machine (ARM) processors. According to some examples, circuitry 210 also includes an application specific integrated circuit (ASIC) and at least a part of packet processing logic 312 is implemented as hardware elements of the ASIC. According to some examples, circuitry 310 also includes a field programmable gate array (FPGA) and at least a part of packet processing logic 312 is implemented as hardware elements of the FPGA.

According to some examples, apparatus 300 includes packet processing logic 312. Packet processing logic 312 is executed or implemented by circuitry 310 to perform processing as described with reference to FIGS. 5-11 described below.

Various components of apparatus 300 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Figure 4:
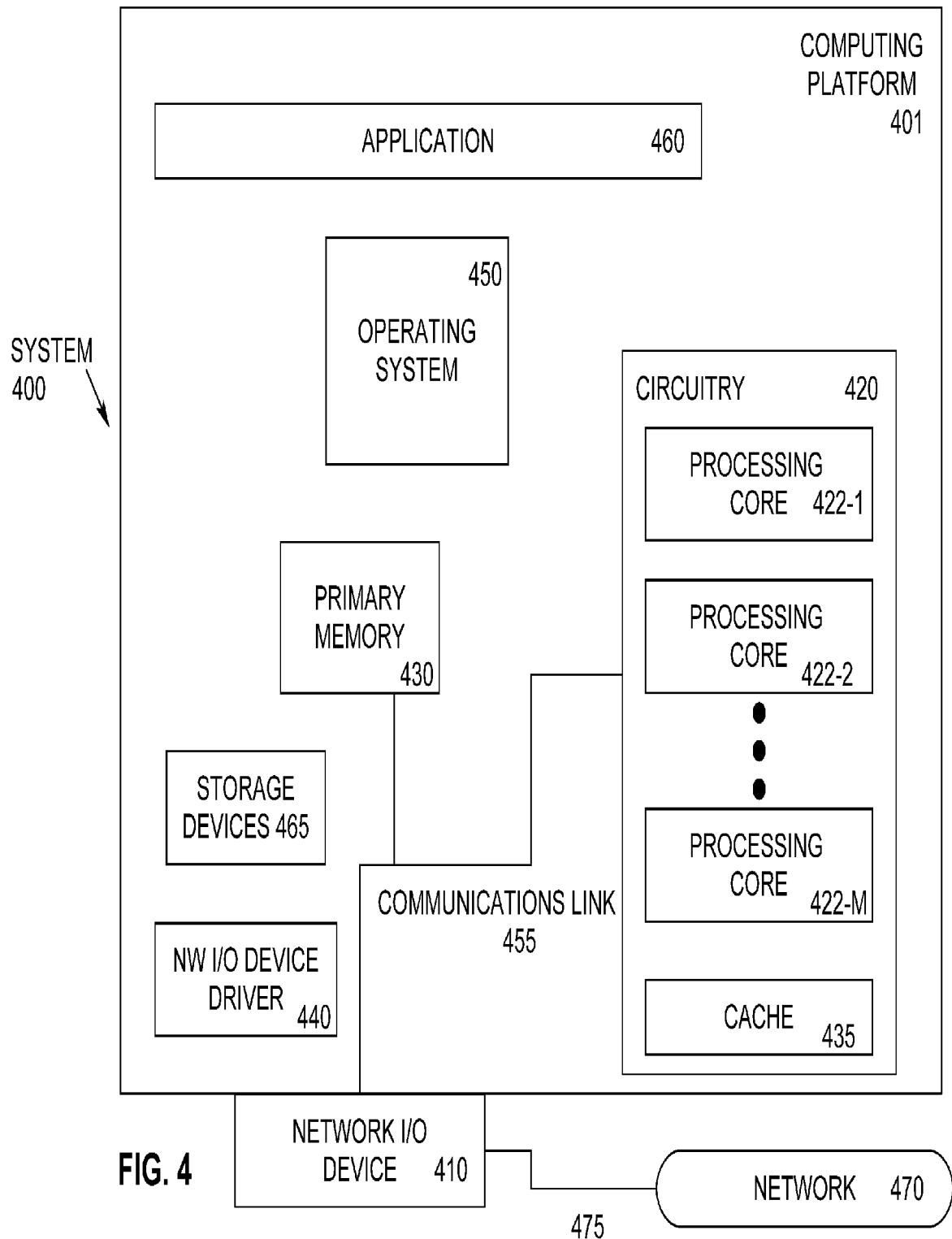
FIG. 4 illustrates an example computing platform diagram.

FIG. 4 illustrates an example computing system 400. As shown in FIG. 4, computing system 400 includes a computing platform 401 coupled to a network 470. In some examples, as shown in FIG. 4, computing platform 401 may couple to network 470 (which may be the same as network 202 of FIG. 2, e.g., the Internet) via a network communication channel 475 and through a network I/O device 410 (e.g., a network interface controller (NIC)) having one or more ports connected or coupled to network communication channel 475. In some embodiments, there are many network I/O devices coupled to computing platform 101. In some embodiments, the network I/O devices are coupled to multiple networks.

According to some examples, computing platform 401, as shown in FIG. 4, may include circuitry 420, primary memory 430, a network (NW) I/O device driver 440, an operating system (OS) 450, one or more application(s) 460, and storage devices 465. In one embodiment, OS 450 is Linux™. In another embodiment, OS 450 is Unix™. In other embodiments, other OSs may also be used. In an embodiment, packet processor 104 of FIG. 1 is implemented as part of application 460 and/or OS 450, and packet filter rules (PFRs), packets, and packet metadata are stored in one or more of primary memory 430 and/or storage devices 465. In an embodiment, at least a part of packet processing logic 312 is performed by network I/O device driver 440 and/or network I/O device 410.

In at least one embodiment, storage devices 465 may be one or more of hard disk drives (HDDs) and/or solid-state drives (SSDs). In an embodiment, storage devices 465 may be non-volatile memories (NVMs). In some examples, as shown in FIG. 4, circuitry 420 may communicatively couple to primary memory 430 and network I/O device 4710 via communications link 455. In an embodiment, communications link 455 is a peripheral component interface express (PCIe) interconnect. Although not shown in FIG. 4, in some examples, operating system 450, NW I/O device driver 4740 or application 460 may be implemented, at least in part, via cooperation between one or more memory devices included in primary memory 430 (e.g., volatile or non-volatile memory devices) and elements of circuitry 420 such as processing cores 422-1 to 422-$m$, where "m" is any positive whole integer greater than 2. In an embodiment, at least a part of packet processing logic 312 may be executed by one or more processing cores 422-1 to 422-$m$ to process packets by applying PFRs to the packets.

In some examples, computing platform 401, may include, but is not limited to, a server, a server array or server farm, a web server, a network server, an Internet server, a disaggregated server, a work station, a mini-computer, a main frame computer, a supercomputer, a network appliance, a web appliance, a distributed computing system, multiprocessor systems, processor-based systems, a laptop computer, a tablet computer, a smartphone, or a combination thereof. Also, circuitry 420 having processing cores 422-1 to 422-$m$ may include various commercially available processors, including without limitation Intel® Atom®, Celeron®, Core (2) Duo®, Core i3, Core i5, Core i7, Itanium®, Pentium®, Xeon® or Xeon Phi® processors; ARM processors, and similar processors. Circuitry 420 may include at least one cache 435 to store data.

According to some examples, primary memory 430 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 430 may include one or more hard disk drives within and/or accessible by computing platform 401. In an embodiment, primary memory is augmented with a ternary content addressable memory (TCAM).

Figure 5:
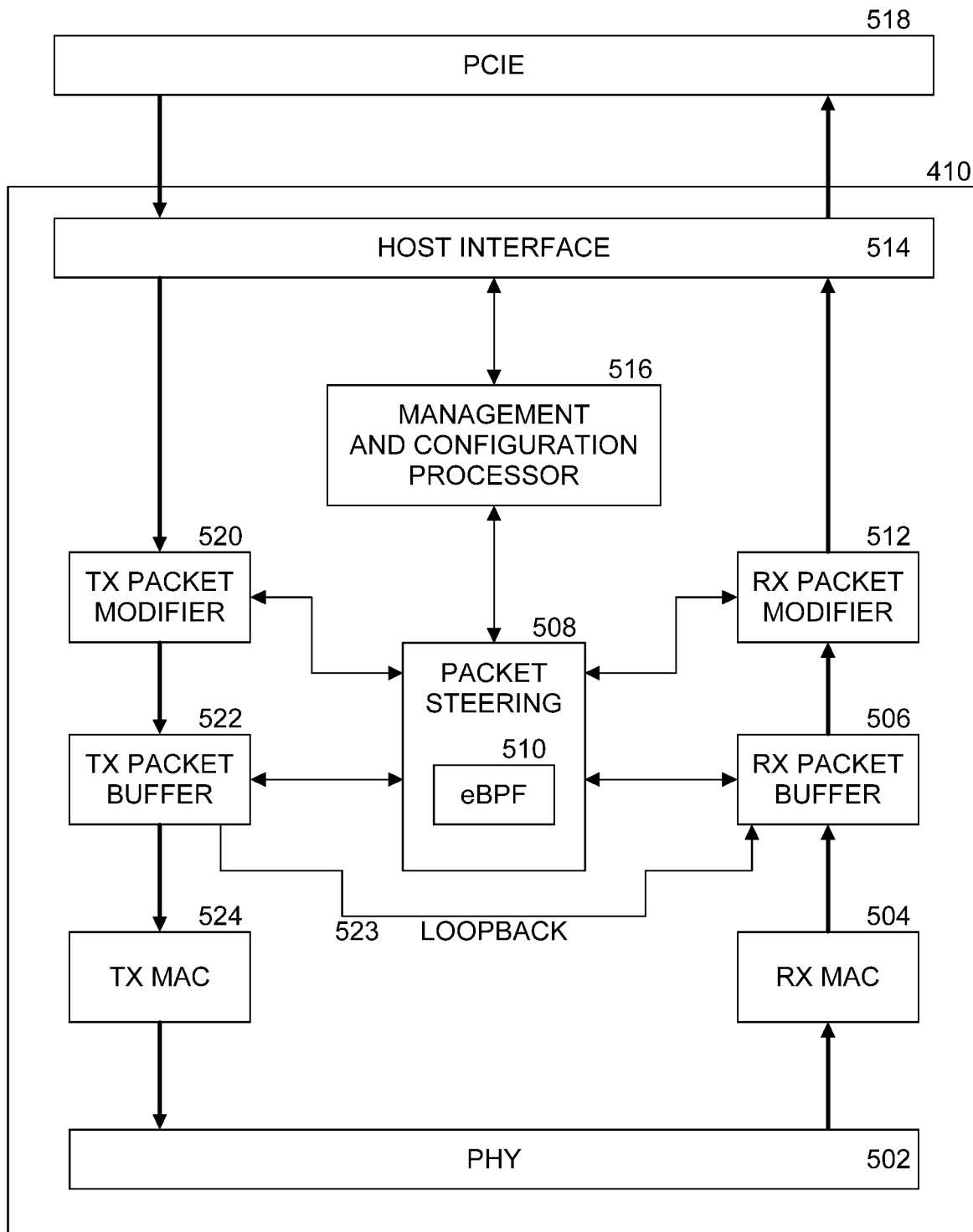
FIG. 5 illustrates an example hardware component to process a packet.

FIG. 5 illustrates an example hardware component to process a packet. In an embodiment, the hardware component implements at least part of packet processing logic 312 in network I/O device 410. Network I/O device 410 includes one or more physical (PHY) layer components 502 to receive and transmit data, including packets from and to network 470. Receive (Rx) media access control (MAC) component 504 receives the packets from PHY 502 and stores the packets in Rx packet buffer 506. Packet steering component 508 includes logic to parse packets, apply PFRs, apply access control lists (ACLs), and control loopback and switch processing. In an embodiment, packet steering component 508 includes a BPF 510 component.

Packet steering component 508 classifies a received packet based at least in part on the packet header. For example, classification may be performed according to packet attributes such as priority, port number, protocol, network layer, Outer Layer 2.5 header Protocol type (such as multiprotocol layer switching (MPLS), network service header (NSH)), Layer 2.5 priority (such as MPLS priority), Source media access control (MAC), Destination MAC, Packet length, IP Diff Serve Code Point (DSCP), IP Protocol type, IP serial peripheral interface (SPI) type, Institute of Electrical and Electronics Engineers (IEEE) Working Group 802.1 standard Ethernet priority bits (pbits), and so on. Examples of PFRs include Network Working Group Request for Comment (RFC) 3704/2827 Addr Range Filtering Rules, RFC 3704/2827 Anti-Spoof rules, white list and black list rules. In an embodiment, packet steering component 508 performs packet processing stages on the packet. For example, packet processing stages include one or more of encryption, selecting a tunnel, traffic management, Quality of Service (QoS) decision making, fragmentation and reassembly, Deep Packet Inspection (DPI), packet scheduling, traffic shaping, data record generation for billing and so on. In an embodiment, BPF 510 assists packet steering component 508 in performing packet processing.

Packet steering component 508 controls forwarding of packets from Rx packet buffer 506 to Rx packet modifier 512. Rx packet modifier 512 performs segmentation offloads, checksum offloads, tag insertions and any other modifications needed for the incoming packet. Another example is a tunnel offload where an additional outer header is added to the packet before the packet is transmitted and removed on receipt before the packet is presented to the OS. Packets are passed through host interface component 514 as coordinated by instructions being executed by management and configuration processor (MCP) 516. In an embodiment, MCP is used to program the rules for the BPF into packet steering 508.

Packets are communicated through communications link 455, such as PCIe interconnect 518, to OS 450 and/or application 460 for further processing.

Packets to be transmitted by network I/O device 410 are received over PCIe 518 via host interface 514. Packets are modified by transmit (Tx) modifier 520 by segmentation offloads, checksum offloads, tag insertions and any other modifications needed for the outgoing packet. The modified packet is stored in Tx packet buffer 522. Packets are obtained from Tx packet buffer 522 by Tx MAC 524 for transmitting through PHY 502 to network 470.

Many NIC and internal packet steering rules can be implemented as BPF rules in an BPF executing on a generic HW engine, such as network I/O device 410.

There are multiple ways to allow filter programs such as BPF to access HW offload resource. In one instance, the Linux™ kernel has extended the BPF by using negative packet offsets One approach is to extend the BPF for HW access is to designate another set of negative offsets for HW capabilities. In this approach, a discovery mechanism added. The application needs a way to know if the HW offload capabilities are available. One discovery mechanism is to read a preset address (for example, −2000) and for each offload that's present a bit is set to 1 in the returned data value. Other discovery mechanisms may also be used.

Another approach is to add one or more new commands. New bytecode commands are added that the low level native compiler replaces with the appropriate call for the specific HW available. In this case there would be no auto discovery, since the native compiler can have library implementations for offloaded HW.

Another approach is to use a special map, such as a special BPF_MAP_TYPE_PROG_ARRAY which points to code fragments that perform predetermined functions (for example, read a HW calculated checksum (XSUM) into a BPF register, or set forwarding HW queue assignments).

Another approach is to use BPF calls (e.g., using a BPF_CALL opcode) with new function codes. For example, define code 1000 to perform checksum retrieval (e.g., static u16**get_offload_csum)(void)=(void*)1000). A map value can be read to determine which capabilities are present, or in the case of the BPF_CALL instruction, a header file can be provided by a network I/O device vendor to compile programs against, containing definitions like the above example to allow calling HW-provided methods. Alternatively, a call can be made to get a bitmap of available HW offload capabilities.

In each of the approaches except for the new command approach, there is no need for a formal extension of the BPF framework.

In the present disclosure, HW offload examples are shown as BPFs. In various embodiments, many other networking decisions, actions, and/or functions, as well as many other data filtering decisions, actions, and/or functions may be represented as BPFs.

Figure 6:
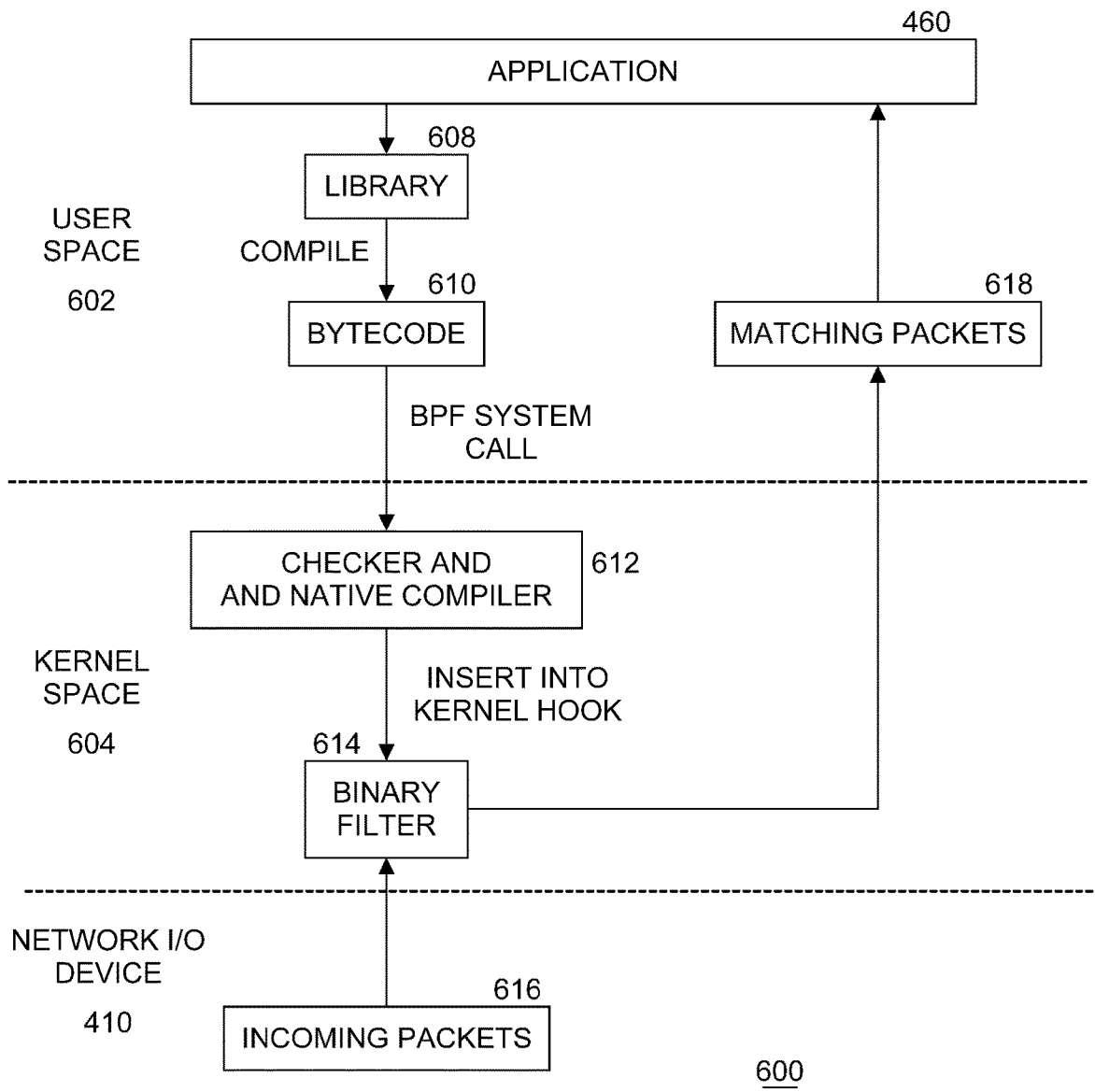
FIG. 6 illustrates an example of a BPF implemented in software.

FIG. 6 illustrates an example of a BPF implemented in software. Application 460 is running in user space 602 of OS 450 of computing platform 401. A BPF is compiled into machine-independent bytecode 610 using an BPF library function 608. The library function makes a BPF system call to checker and native compiler component 612 in kernel space 604 of OS 450. In one embodiment, the kernel space is within a Linux™ kernel. In another embodiment, the kernel space is within a Unix™ kernel. Checker and native compiler component 612 verifies the semantics of the call and compiles the bytecode into machine dependent assembly language code. The machine dependent assembly language code is inserted into a kernel "hook" in kernel code and is executed along with the kernel. When incoming packets 616 arrive at network I/O device 410, network I/O device HW passes each packet to binary filter 614 for processing in SW. Binary filter 614 is the representation of the BPF in machine dependent binary code. Incoming packets that pass through the binary filter are sent as matching packets 618 back to application 460.

Figure 7:
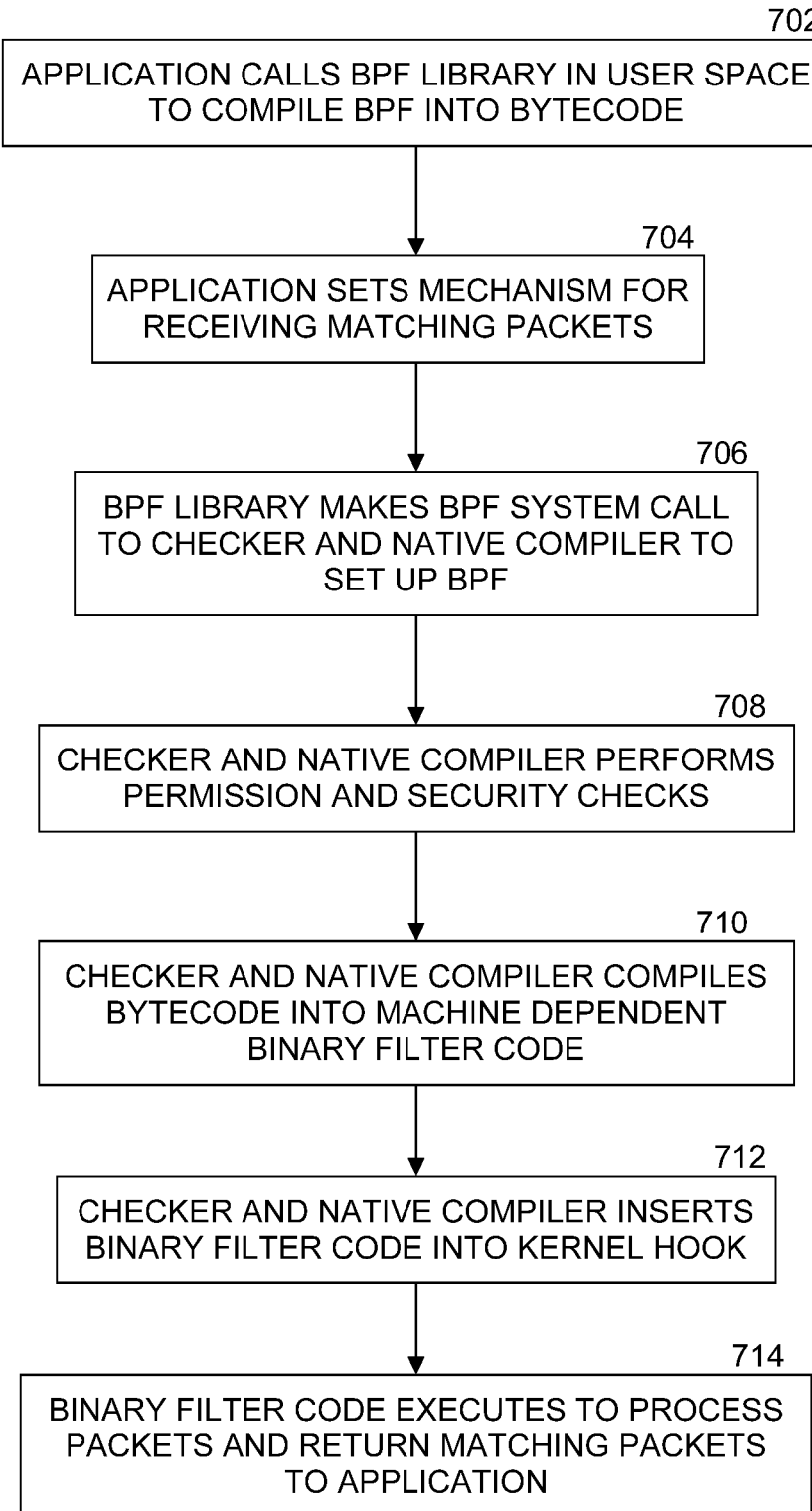
FIG. 7 illustrates a flow diagram of a BPF implemented in software.

FIG. 7 illustrates a flow 700 diagram of a BPF implemented in software. At block 702, application 460 calls a function in BPF library 608 in user space 602 to compile the BPF into bytecode 610. For example, the BPF library function call may be:

Bytecodeptr=BPF compile ("host==example.com && tcp.reset==1")

Wherein a source or destination host computing platform is example.com, a reset flag is set in the packet, and execution of the function returns a pointer to machine independent bytecode for the BPF.

At block 704, application 460 sets the mechanism for receiving matching packets 618 from operation of the BPF. For example, the application "attaches" the BPF to whatever receive mechanism is available for receiving matching packets. In one example, a callback function may be used, which will be called once for each matching packet.

BPF_attach (bytecode_ptr, device_info, callback_fn)

Wherein callback_fn will be called once for each matching packet, device_info includes information about network I/O device 410.

At block 706, BPF library 608, inside of the implementation of the compile library call, makes an BPF system call to checker and native compiler 612 in kernel space 604 to set up the BPF on behalf of application 460. Next, at block 708 checker and native compiler component 612 performs permission and security checks on the call. When permission and security checks are passed, checker and native compiler component 612 compiles bytecode 610 into machine dependent binary filter code 614 at block 710. At block 712, checker and native compiler component 612 inserts binary filter code 614 into the kernel hook. The BPF (resident in kernel space 604) is now ready to process incoming packets 616 received from network I/O device 410. When incoming packets are received, binary filter code 614 executes to process the packets and returns matching packets 618 to application 460. In one example using a callback function, for each packet matching the BPF rules, the callback function (e.g., callback_fn) is called by library 608 providing a pointer to a copy of the packet in memory 430.

Figure 8:
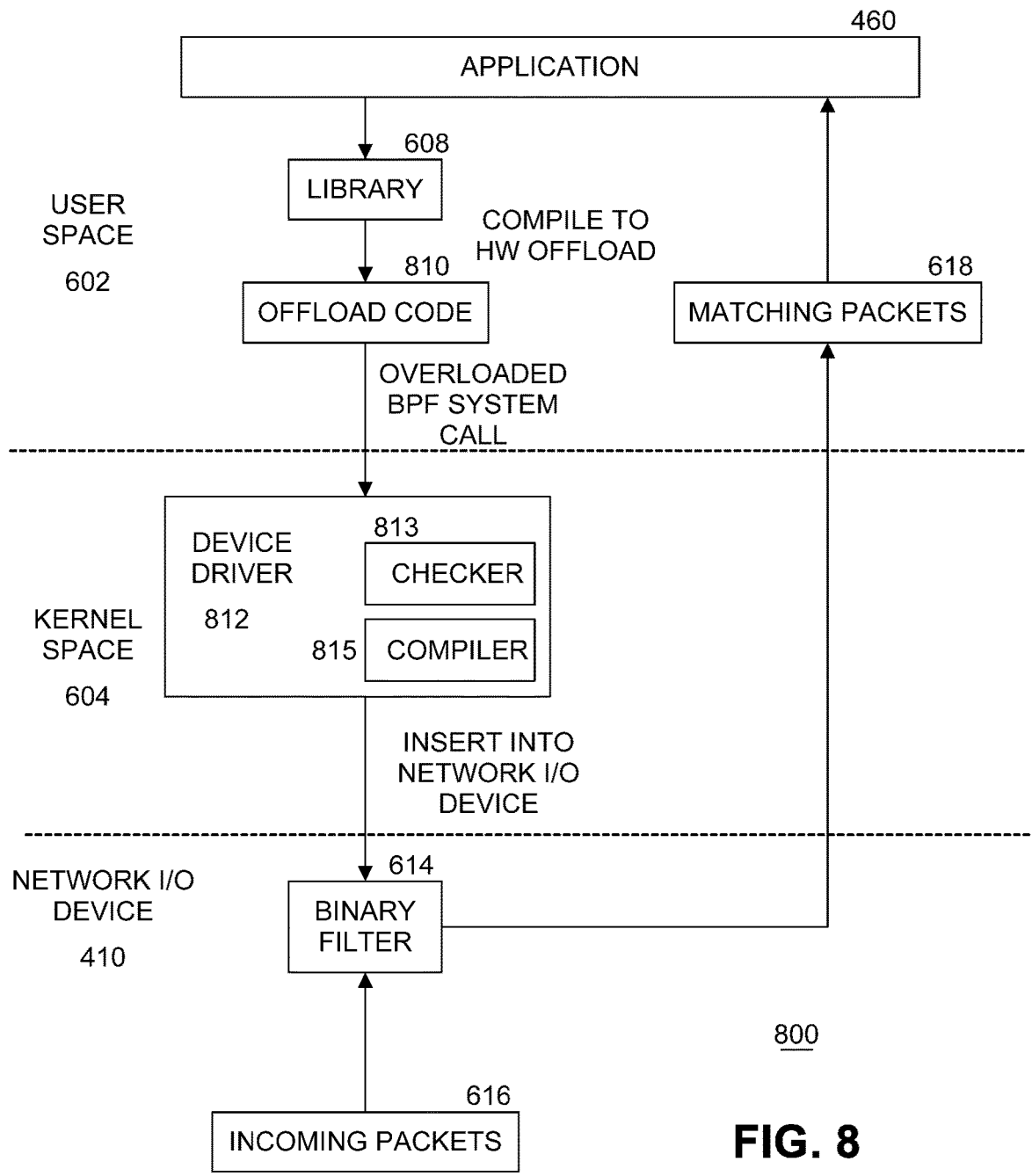
FIG. 8 illustrates an example of a BPF implemented with hardware offload.

FIG. 8 illustrates an example of an BPF implemented with hardware offload. When the BPF is executed in network I/O device 410, it becomes possible to offload BPF code from kernel space 604 of OS 450 to hardware. As before, application 460 is running in user space 602 of OS 450 of computing platform 401. A BPF is compiled into machine independent offload code 810 using BPF library 608. The library function makes a BPF system call to device driver and checker component 812 in kernel space 604 of OS 450. In one embodiment, an overloaded BPF system call is used. Kernel of OS 450 recognizes that network I/O device 410 provides HW offload support and instead of calling checker and native compiler component 612, hands off the request to network I/O device driver 812. Device driver 812 verifies the semantics of the call and sets up a device driver entry point for the BPF using checker component 813. Device driver 812 compiles offload code 810 into machine dependent assembly language code (e.g., native instructions for network I/O device 410) using compiler 815. The machine dependent assembly language code is inserted as binary filter 614 into network I/O device 410 by device driver 812. When incoming packets 616 arrive at network I/O device 410, the network I/O device processes each packet by binary filter code 614 in HW. Incoming packets that pass through the BPF are sent as matching packets 618 back to application 460. In an embodiment, the binary filter is implemented as settings and logic within network I/O device (e.g., NIC) 410.

Figure 9:
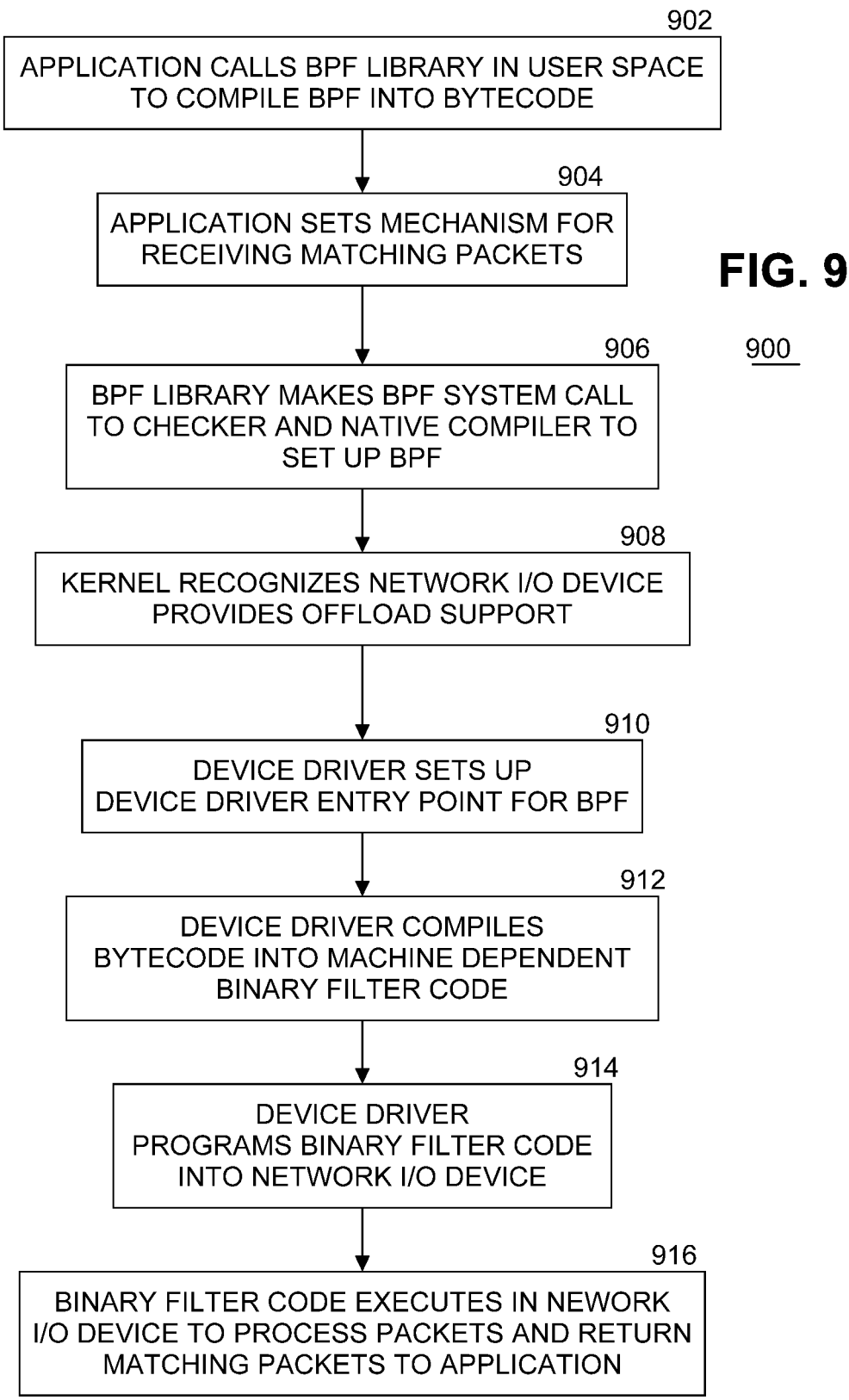
FIG. 9 illustrates a flow diagram of a BPF implemented with hardware offload.

FIG. 9 illustrates a flow 900 diagram of a BPF implemented with hardware offload. At block 902, application 460 calls a function in BPF library 608 in user space 602 to compile the BPF into BPF bytecode 1010. At block 904, application 460 sets the mechanism for receiving matching packets 618 from operation of the BPF. At block 906, BPF library 608, inside of the implementation of the compile library call, makes an BPF system call to device driver 812 in kernel space 604 to set up the BPF on behalf of application 460. The call goes to the kernel system call layer. After the kernel identifies that this fits a registered offload capability, this gets forwarded to the device specific driver at the next stage.

Next, at block 908, kernel of OS 450 recognizes that the network I/O device selected for the BPF provides HW offload support for BPFs and instead of calling checker and native compiler 612, calls device driver 812. Here the kernel forwards the call to the device specific driver for last stage compile and insertion into the HW.

At block 910, device driver 812, using checker 813 component in kernel space 604 sets up a device driver entry point for the BPF, called with a copy of the offload bytecode and miscellaneous information. The device driver might use the kernel's standard checker, but will likely have its own checker for additional checks, it will always have its own last stage compiler.

For example, the call could look like the following.

Nic_insert_ebf (bytecode_ptr, device_info)

In an embodiment, block 910 is performed during system initialization. Device driver 812 compiles offload code 810 into machine dependent binary filter code 614 at block 912 using compiler 815. This binary filter code includes instructions specifically for network I/O device 410. At block 914, device driver 812 programs binary filter code 614 into network I/O device 410. The binary filer code (resident in network I/O device hardware) is now ready to process incoming packets 616 received by network I/O device 410. When incoming packets are received, binary filter code 614 executes in network I/O device 410 to process the packets and returns matching packets 618 to application 460 at block 916. In one example using a callback function, for each packet matching the BPF rules, the callback function (e.g., callback_fn) is called by library 608 providing a pointer to a copy of the packet in memory 430.

In an embodiment, the OS kernel may dynamically switch between a software implementation (as shown in FIGS. 6 and 7) and a hardware implementation (as shown in FIGS. 8 and 9).

Figure 10:
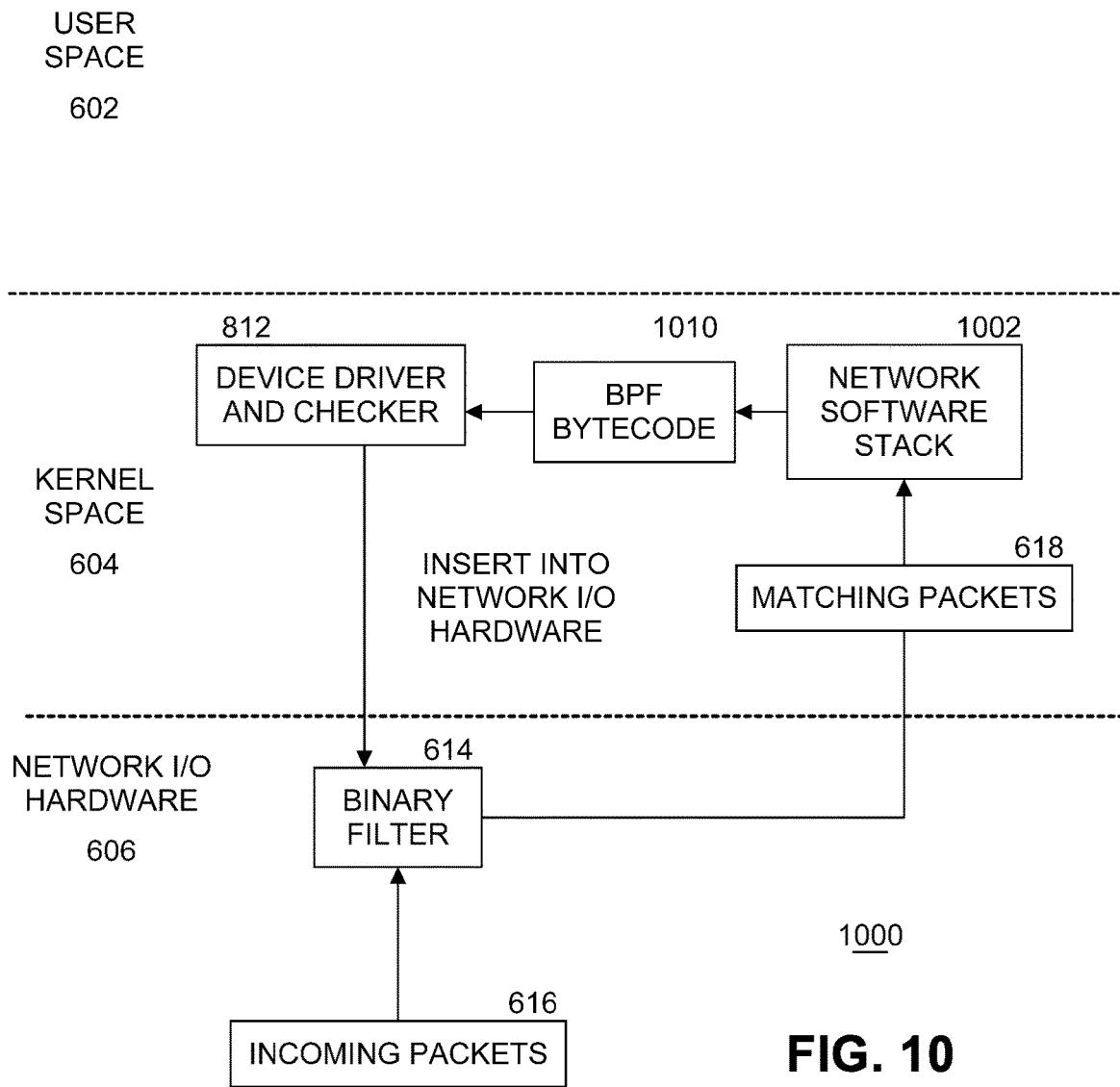
FIG. 10 illustrates an example of a BPF implemented with hardware offload for firewall rules.

FIG. 10 illustrates an example of an BPF implemented with hardware offload for firewall rules. In this instance, the filter client is the OS network software stack resident in kernel space 604 and the filters are used to implement firewall rules. A network software stack is an implementation of a computer networking protocol suite. In this example, the OS kernel is itself the caller of the BPF and uses the BPF to offload internal decisions to network I/O device hardware (for example, application of firewall rules). Note that selecting packets to pass is just one example of am BPF action. Other examples include dropping packets that match a rule, diverting packets to a special queue, adding or modifying a packet header (network address translation (NAT)), etc. Kernel of OS 450 recognizes that network I/O device 410 provides HW offload support. Network software stack 1002 generates machine independent BPF bytecode 1010 and calls device driver 812. Device driver 812 verifies the semantics of the call and sets up a device driver entry point for the BPF. In an embodiment, setting up the entry point is part of registration, which is done at device driver load time. Device driver 812 compiles BPF bytecode 1010 into machine dependent code (e.g., instructions for network I/O device 410). In an embodiment, the machine dependent code comprises values stored in HW registers. The machine dependent code is programmed into network I/O device 410 by device driver 812 as binary filter 614. When incoming packets 616 arrive at network I/O device 410, the network I/O device processes each packet by binary filter code 614 in HW. Incoming packets that pass through the BPF are sent as matching packets 618 back to network stack 1002 within kernel space 604. In various embodiments, the binary filter could have different implementations options, including state information stored in registers, lists and TCAMs.

Figure 11:
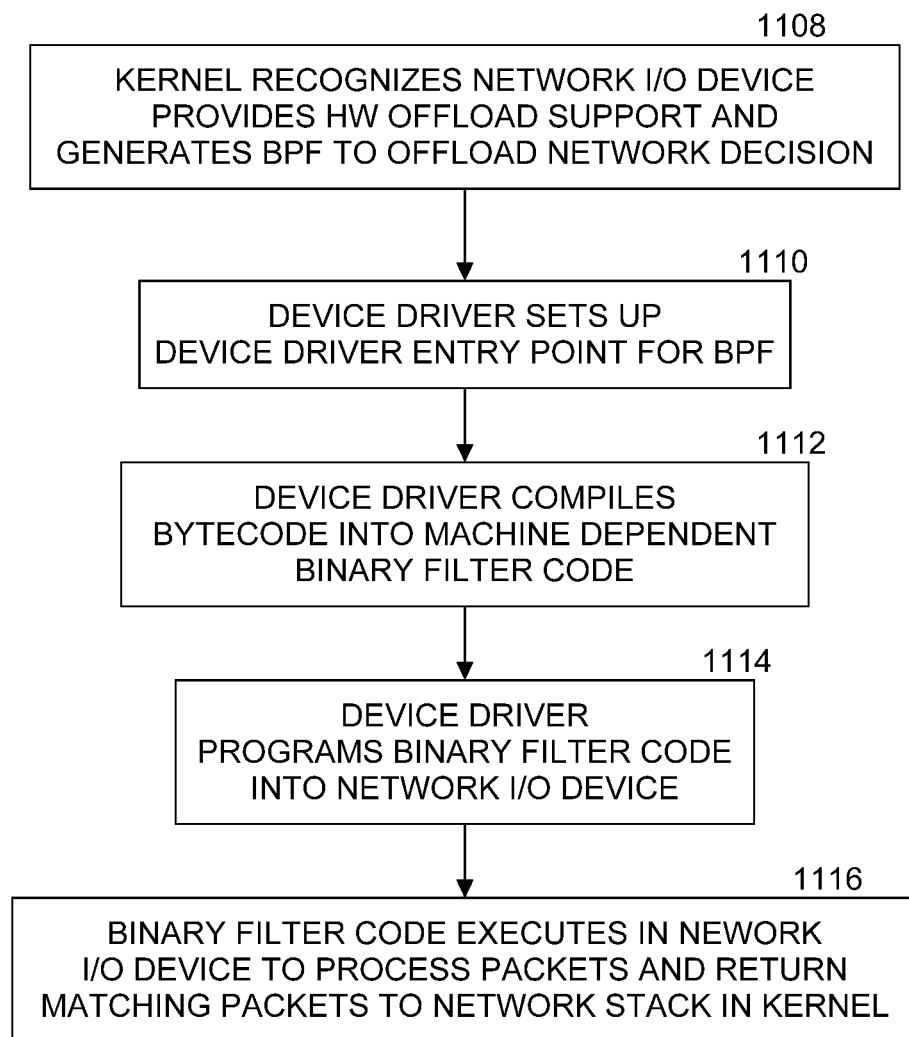
FIG. 11 illustrates a flow diagram of a BPF implemented with hardware offload for firewall rules.

FIG. 11 illustrates a flow 1100 diagram of an BPF implemented with hardware offload for firewall rules. At block 1108, kernel of OS 450 recognizes that the network I/O device provides HW offload support for BPFs. Network software stack 1002 generates BPF bytecode 1010. Instead of calling checker and native compiler 612, the OS kernel calls device driver 812. At block 1110, device driver 812 in kernel space 604 sets up a device driver entry point for the BPF, called with a copy of the offload bytecode and miscellaneous information. In an embodiment, device driver registration is performed before the other steps of FIG. 11. The kernel sees a rule and knows that network I/O device can offload the rule. In an embodiment, part of the registration process is to set up the function that the kernel will call in the device driver when kernel wants to offload a rule (e.g., device driver entry point).

Device driver 812 compiles BPF bytecode 1010 into machine dependent binary filter code 614 at block 1110. This binary filter code includes instructions specifically for network I/O device 410. At block 1114, device driver 812 programs binary filter code 614 into network I/O device 410. The binary filter code (resident in network I/O device hardware) is now ready to process incoming packets 616 received by network I/O device 410. When incoming packets are received, binary filter code 614 executes in network I/O device 410 to process the packets and returns matching packets 618 to network software stack 1002 at block 1116. In one example using a callback function, for each packet matching the BPF rules, the callback function (e.g., callback_fn) is called by library 608 providing a pointer to a copy of the packet in memory 430.

In an embodiment, a full HW offload needs the network I/O device to make sure that each BPF from an application is properly contained. The BPF must not be able to access hidden offloads, such as hidden tunnels and NATs. In other words the BPF must see the packet as the host would have after all the changes network I/O device hardware would have done to the packet. The BPF must honor resource limits (such as bandwidth, power, compute cycles, etc.) The BPF also must not be able to get information from other application's data (including side channels).

In embodiments of the present invention, there are four ways to add HW offloads to BPF processing: 1) new commands; 2) new packet offsets; 3) a map to code fragments; and 4) calling functions in the kernel. The decision on which way to implement HW offloads is a design decision of the system architecture, and not something decided at run time.

Figure 12:
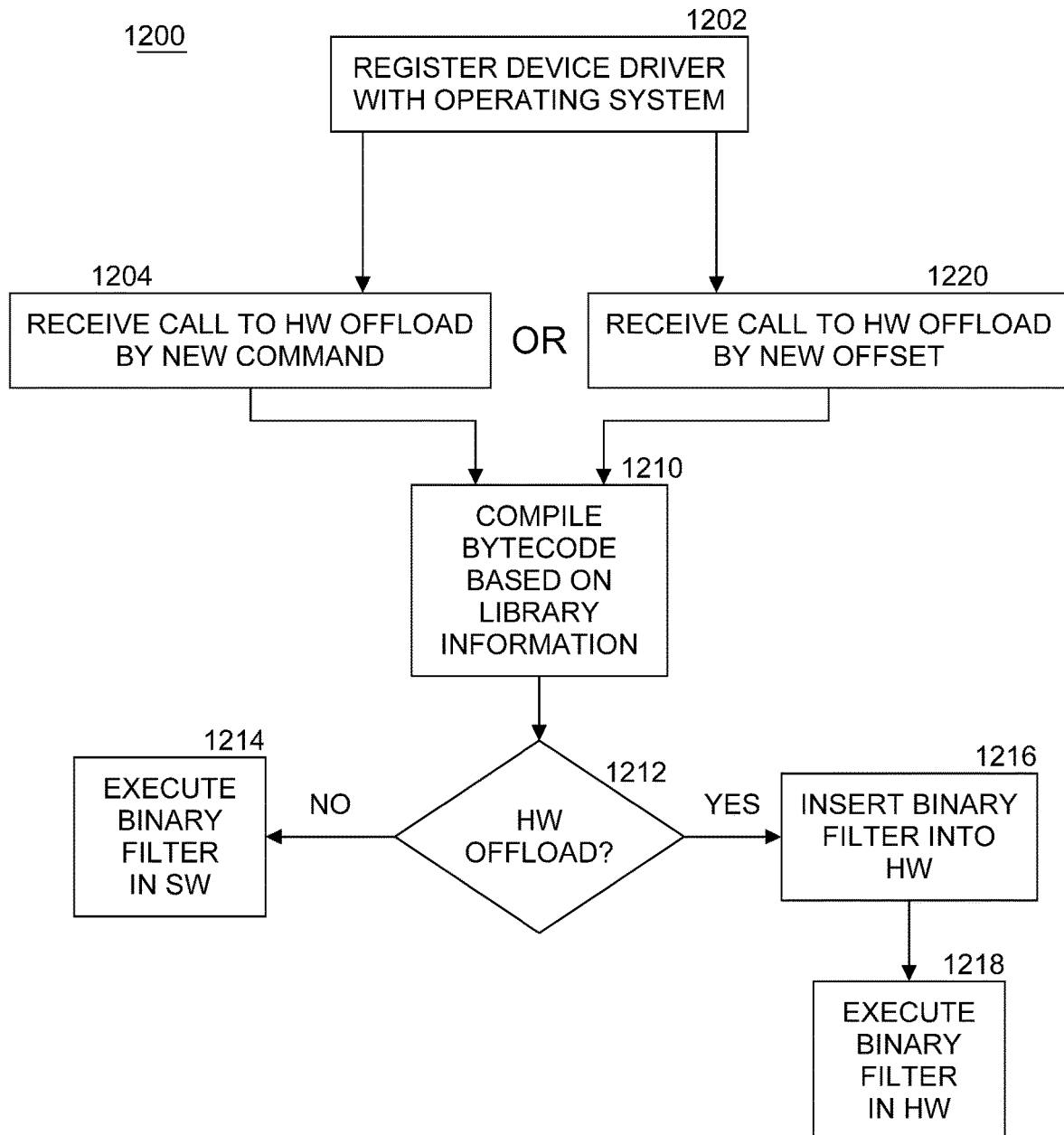
FIG. 12 illustrates an example of a flow diagram of how to expand BPF semantics for a hardware offload interface.

FIG. 12 illustrates an example of a flow diagram of how to expand BPF semantics for a hardware offload interface. At block 1202, device driver 812 is registered with the OS. In one embodiment, the device driver is specific to network I/O device 410. In another embodiment, the device driver is associated with a network processing unit (NPU) having a dedicated BPF HW offload ASIC. In an embodiment, the device driver is the source of the information on which offloads are available. In other embodiments, the information regarding available offloads may be obtained from other components in the system, and the decision to offload or not offload may be based on information in addition to available capabilities. The device driver registers the available offloads with the OS. Registration includes passing a data structure to the OS describing the HW offload capabilities provided by the network I/O device. The information flows as follows. The device driver calls the OS. The OS calls the library. Sometimes also the library calls the application (the application does not have to be aware of the offload for the offload to be used, if the application calls to perform a function that the OS can offload, the function will be offloaded). The application via library calls asks the OS for a BPF. The kernel checks registration data for available offloads and decides if the request should be satisfied in HW or SW.

When a new command is used, at block 1204 HW offload for the BPF is called by a new command and received by the OS. Examples of new commands are a) validate (using HW if possible) a TCP checksum in a packet; b) validate that a packet is coming from an interface with an address that matches the interface's source address; and c) assign traffic priority flags based on a policy.

The bytecode 610 is then compiled by compiler 815 into binary filter 614 based at least in part on information obtained from library 608. At decision point 1212, if no HW offload is selected by the kernel then the kernel executes binary filter 614 in software (SW) in kernel space 604 at block 1214. If HW offload is selected by the kernel then the device driver is called to compile the binary filter and inserted the binary filter into the HW (i.e., network I/O device 410) at block 1216. Next, at block 1218 binary filter 614 is executed in HW (i.e., the network I/O device).

When a new packet offset is used, processing proceeds at block 1220 wherein a HW offload is called by the new offset and received by the OS. BPF programs can read packet data by offset. An extension to this feature is uses negative offsets to give access to metadata that's not part of the packet. In an embodiment, current metadata is stored at offsets starting with −1000, thus the new HW offloads offsets can start at −2000, for example. New packet offset processing proceeds similar to using a new command, with blocks 1206, 1208, 1210, 1212, 1214, 1216, and 1218.

Note that depending on the method used, the bytecode can be translated into binary filter 614 in the device driver 812, by network I/O device firmware (FW), or a combination of SW and FW, or the state of internal registers, TCAMs, lists, etc.

Figure 13:
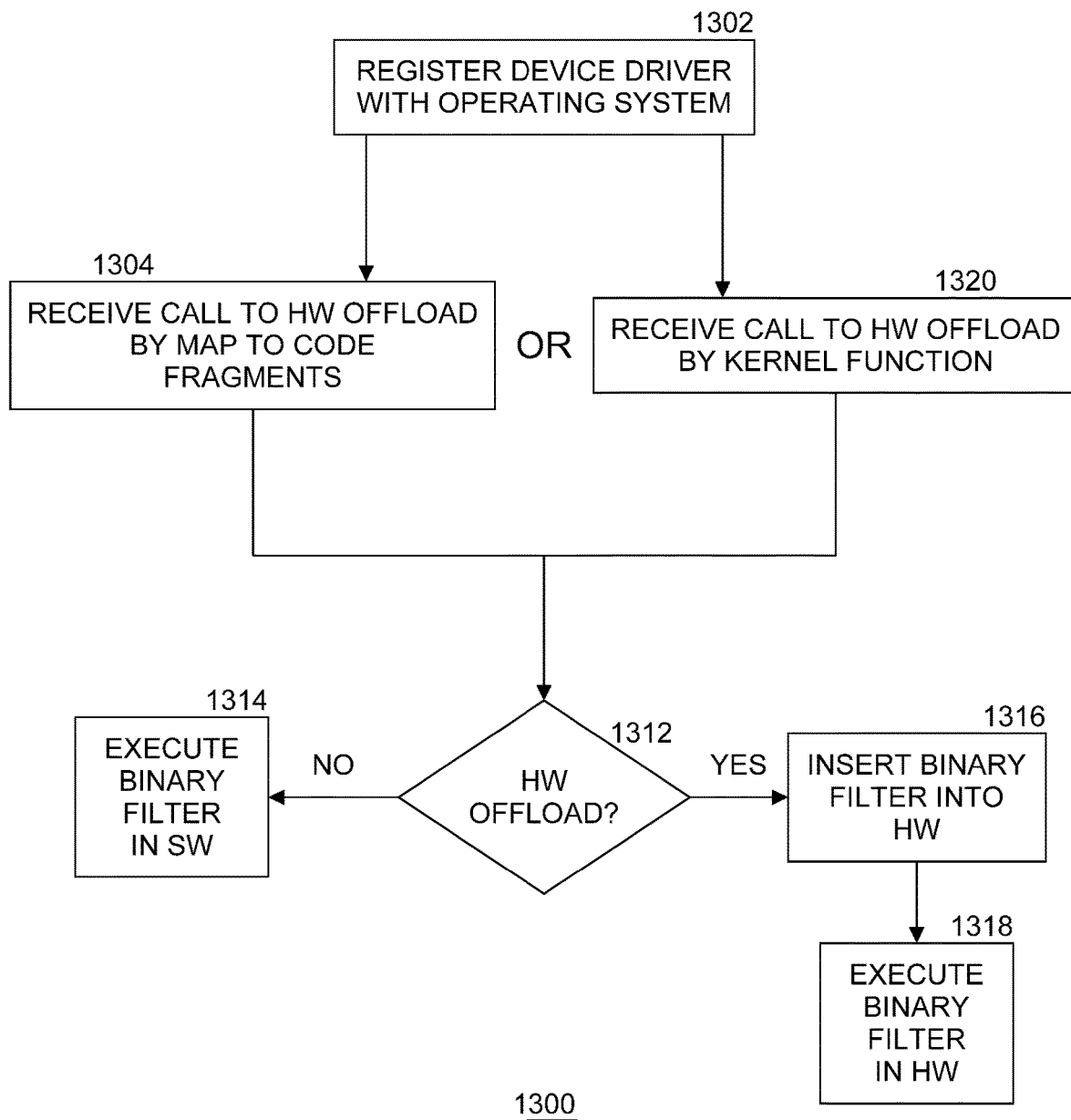
FIG. 13 illustrates another example of a flow diagram of how to expand BPF semantics for a hardware offload interface.

FIG. 13 illustrates another example of a flow diagram of how to expand BPF semantics for a hardware offload interface. At block 1302, device driver 812 (specific to network I/O device 410) is registered with the OS. Registration includes passing a data structure to the kernel describing the HW offload capabilities provided by the network I/O device.

When a map to code fragments is used, processing proceeds to block 1304 wherein a HW offload is called by using a map to code fragments and received by the OS. In an embodiment, a table is provided for values in the map that point to code fragments. For example, a "1" could be a map for a TCP checksum validation, and a "2" could map to calculate a TCP next packet header assuming in order reception of a full maximum transmission unit (MTU).

In an embodiment, the kernel includes default implementations of non-offload code fragments, so the bytecode can be the same for SW and HW approaches. The map points to either the HW offloaded or SW version. At decision point 1312, if no HW offload is available by any registered HW device driver, then the kernel executes binary filter 614 in software (SW), which will be compiled using a default library of code fragments at block 1314. If HW offload has been registered by a HW device driver for this particular functionality, then the kernel will select the correct device driver and pass the bytecode to the device driver along with other parameters. Next, the binary filter is inserted into the HW (i.e., network I/O device 410) by the kernel at block 1316. Next, at block 1318 binary filter 614 is executed in HW (i.e., the network I/O device).

When a function is called in the kernel, processing proceeds at block 1320. For example, a function call might be "Drop_tcp_port(5000)", which would cause a rule to be added either in SW or HW. At decision point 1312, if no HW offload is selected by the kernel, after looking up all registered offloads, then the kernel executes binary filter 614 in software (SW) in kernel space 604 at block 3214. If HW offload is selected by the kernel, after looking up all registered offloads, then the kernel will select the correct device driver and pass the bytecode to the device driver along with other parameters. Next, the binary filter is inserted into the HW (i.e., network I/O device 410) by the kernel at block 1316. Next, at block 1318 binary filter 614 is executed in HW (i.e., the network I/O device).

Figure 14:
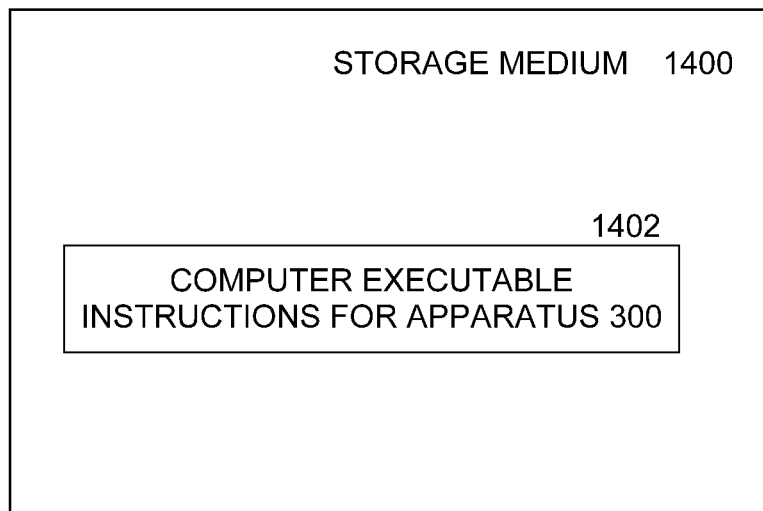
FIG. 14 illustrates an example of a storage medium.

FIG. 14 illustrates an example of a storage medium 1400. Storage medium 1400 may comprise an article of manufacture. In some examples, storage medium 1400 may include any non-transitory computer readable medium or machine readable medium, such as an optical, magnetic or semiconductor storage. Storage medium 1400 may store various types of computer executable instructions, such as instructions 1402 for apparatus 300 to implement logic flows 700, 900, 1100, 1200, and 1300, of FIG. 7, FIG. 9, FIG. 11, FIG. 12, and FIG. 13, respectively. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 15:
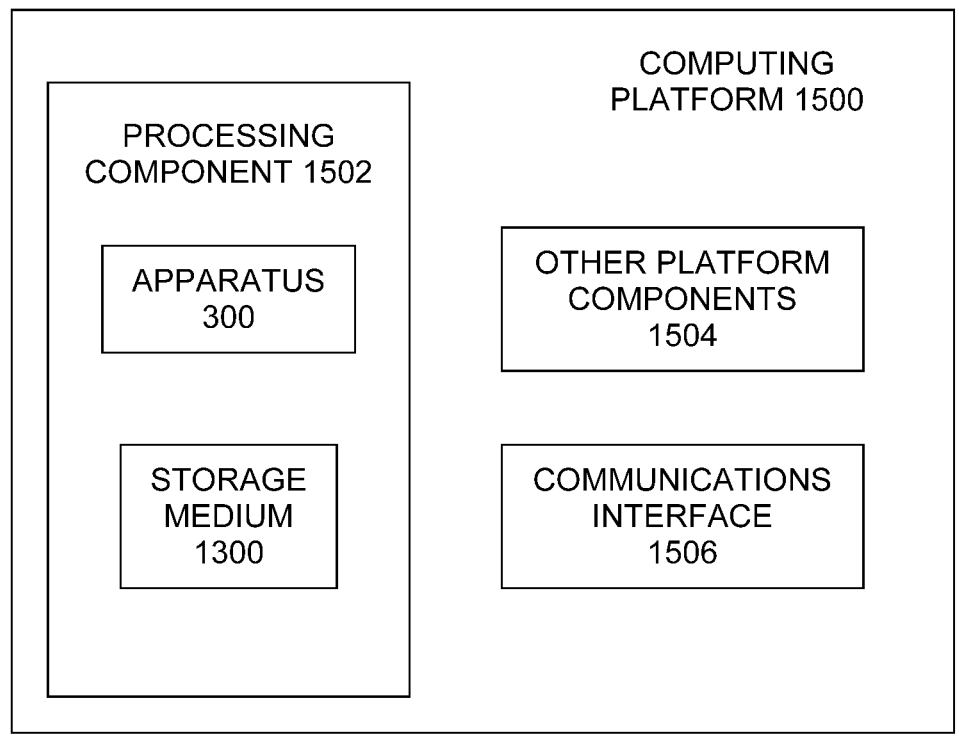
FIG. 15 illustrates another example computing platform.

FIG. 15 illustrates an example computing platform 1500. In some examples, as shown in FIG. 15, computing platform

1500 may include a processing component 1502, other platform components 1504 and/or a communications interface 1506.

According to some examples, processing component 1502 may execute processing operations or logic for apparatus 300 and/or storage medium 1500. Processing component 1502 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1504 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1506 may include logic and/or features to support a communication interface. For these examples, communications interface 1506 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

The components and features of computing platform 1500 may be implemented using any combination of discrete circuitry, ASICs, logic gates and/or single chip architectures. Further, the features of computing platform 1500 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1500 shown in the block diagram of FIG. 15 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. At least one non-transient machine-readable medium storing instructions associated with an operating system, the instructions being executable by at least one machine, the at least one machine being usable in association with a host computer and network interface controller circuitry, the host computer being to execute, when the host computer is in operation, the operating system and a user space application, the operating system, when executed, having a kernel space, the instructions when executed by the at least one machine resulting in the at least one machine being configured for performance of operations comprising:

providing at least one call associated with the kernel space, the at least one call being usable to set, at least in part, packet filter rules, the packet filter rules corresponding, at least in part, to packet filter rule data, the packet filter rule data being for use in programming, at least in part, packet processing hardware offload circuitry of the network interface controller circuitry to determine, based upon header data of at least one incoming packet and the packet filter rule data, at least one action of the packet filter rules to apply to the at least one incoming packet; and wherein:

the at least one action is configurable to include:
at least one network address translation-related operation associated with the header data; and/or
dropping or forwarding the at least one incoming packet;

when the host computer is in the operation, after registration of at least one device driver of the network interface controller circuitry:
the packet filter rule data is to be associated with the network interface controller circuitry via at least one callback function call; and
the programming, at least in part of the packet processing hardware offload circuitry of the network interface controller circuitry is to be implemented, at least in part, by the at least one device driver associated with the network interface controller circuitry via function parameter data associated, at least in part, with callback function code associated with the at least one device driver associated with the network interface controller circuitry.

2. The at least one non-transient machine-readable medium of claim 1, wherein:

the network interface controller circuitry comprises physical layer circuitry for use in association with Ethernet protocol communication.

3. The at least one non-transient machine-readable medium of claim 2, wherein:
the at least one action is also configurable to comprise:
passing of packet data of the at least one incoming packet to at least one client in the host computer; and/or
adding at least one header to the at least one incoming packet,
modifying the header data of the at least one incoming packet.

4. The at least one non-transient machine-readable medium of claim 3, wherein:
the network interface controller circuitry comprises an application specific integrated circuit (ASIC) for use in association with processing of the at least one incoming packet.

5. The at least one non-transient machine-readable medium of claim 1, wherein:
the function parameter data is to be generated, at least in part, by the at least one device driver associated with the network interface controller circuitry.

6. Host computer circuitry for use with network interface controller circuitry in association with at least one device driver, the host computer circuitry to execute, when the host computer circuitry is in operation, an operating system and a user space application, the operating system, when executed, having a kernel space, the host computer circuitry comprising:
processor circuitry;
storage storing instructions that when executed by the processor circuitry resulting in the host computer circuitry being configured to perform operations comprising:
providing at least one call associated with the kernel space, the at least one call being usable to set, at least in part, packet filter rules, the packet filter rules corresponding, at least in part, to packet filter rule data, the packet filter rule data being for use in programming, at least in part, packet processing hardware offload circuitry of the network interface controller circuitry to determine, based upon header data of at least one incoming packet and the packet filter rule data, at least one action of the packet filter rules to apply to the at least one incoming packet; and
wherein:
the at least one action is configurable to include:
at least one network address translation-related operation associated with the header data; and/or
dropping or forwarding the at least one incoming packet;
when the host computer circuitry is in the operation, after registration of at least one device driver of the network interface controller circuitry:
the packet filter rule data is to be associated with the network interface controller circuitry via at least one callback function call; and
the programming, at least in part of the packet processing hardware offload circuitry of the network interface controller circuitry is to be implemented, at least in part, by the at least one device driver associated with the network interface controller circuitry via function parameter data associated, at least in part, with callback function code associated with the at least one device driver associated with the network interface controller circuitry.

7. The host computer circuitry of claim 6, wherein:
the network interface controller circuitry comprises physical layer circuitry for use in association with Ethernet protocol communication.

8. The host computer circuitry of claim 7, wherein:
the at least one action is also configurable to comprise:
passing of packet data of the at least one incoming packet to at least one client in the host computer; and/or
adding at least one header to the at least one incoming packet,
modifying the header data of the at least one incoming packet.

9. The host computer circuitry of claim 8, wherein:
the network interface controller circuitry comprises an application specific integrated circuit (ASIC) for use in association with processing of the at least one incoming packet.

10. The host computer circuitry of claim 6, wherein:
the function parameter data is to be generated, at least in part, by the at least one device driver associated with the network interface controller circuitry.

11. Distributed computing system for use in providing at least one service via an Internet network, the distributed computing system comprising:
host computer circuitry for use with network interface controller circuitry in association with at least one device driver, the host computer circuitry to execute, when the host computer circuitry is in operation, an operating system and a user space application, the operating system, when executed, having a kernel space, the host computer circuitry comprising:
processor circuitry;
storage storing instructions that when executed by the processor circuitry result in the host computer circuitry being configured to perform operations comprising:
providing at least one call associated with the kernel space, the at least one call being usable to set, at least in part, packet filter rules, the packet filter rules corresponding, at least in part, to packet filter rule data, the packet filter rule data being for use in programming, at least in part, packet processing hardware offload circuitry of the network interface controller circuitry to determine, based upon header data of at least one incoming packet and the packet filter rule data, at least one action of the packet filter rules to apply to the at least one incoming packet; and
wherein:
the at least one action is configurable to include:
at least one network address translation-related operation associated with the header data; and/or
dropping or forwarding the at least one incoming packet;
when the host computer circuitry is in the operation, after registration of at least one device driver of the network interface controller circuitry:
the packet filter rule data is to be associated with the network interface controller circuitry via at least one callback function call; and
the programming, at least in part of the packet processing hardware offload circuitry of the network interface controller circuitry is to be implemented, at least in part, by the at least one device driver associated with the network interface controller circuitry via function parameter data associated, at least in part, with callback function code associated with the at least one device driver associated with the network interface controller circuitry.

12. The distributed computing system of claim 11, wherein:
the network interface controller circuitry comprises physical layer circuitry for use in association with Ethernet protocol communication.

13. The distributed computing system of claim 12, wherein:
the at least one action is also configurable to comprise:
passing of packet data of the at least one incoming packet to at least one client in the host computer; and/or
adding at least one header to the at least one incoming packet,
modifying the header data of the at least one incoming packet.

14. The distributed computing system of claim 13, wherein:
the network interface controller circuitry comprises an application specific integrated circuit (ASIC) for use in association with processing of the at least one incoming packet.

15. The distributed computing system of claim 11, wherein:
the function parameter data is to be generated, at least in part, by the at least one device driver associated with the network interface controller circuitry.

16. A method implemented using network interface controller circuitry for use in association with host computer circuitry, the host computer circuitry to execute, when the host computer circuitry is in operation, an operating system and a user space application, the operating system, when executed, having a kernel space, the method comprising:
providing at least one call associated with the kernel space, the at least one call being usable to set, at least in part, packet filter rules, the packet filter rules corresponding, at least in part, to packet filter rule data, the packet filter rule data being for use in programming, at least in part, packet processing hardware offload circuitry of the network interface controller circuitry to determine, based upon header data of at least one incoming packet and the packet filter rule data, at least one action of the packet filter rules to apply to the at least one incoming packet; and
wherein:
the at least one action is configurable to include:
at least one network address translation-related operation associated with the header data; and/or
dropping or forwarding the at least one incoming packet;
when the host computer is in the operation, after registration of at least one device driver of the network interface controller circuitry:
the packet filter rule data is to be associated with the network interface controller circuitry via at least one callback function call; and
the programming, at least in part, of the packet processing hardware offload circuitry of the network interface controller circuitry is to be implemented, at least in part, by the at least one device driver associated with the network interface controller circuitry via function parameter data associated, at least in part, with callback function code associated with the at least one device driver associated with the network interface controller circuitry.

17. The method of claim 16, wherein:
the network interface controller circuitry comprises physical layer circuitry for use in association with Ethernet protocol communication.

18. The method of claim 17, wherein:
the at least one action is also configurable to comprise:
passing of packet data of the at least one incoming packet to at least one client in the host computer; and/or
adding at least one header to the at least one incoming packet,
modifying the header data of the at least one incoming packet.

19. The method of claim 18, wherein:
the network interface controller circuitry comprises an application specific integrated circuit (ASIC) for use in association with processing of the at least one incoming packet.

20. The method of claim 16, wherein:
the function parameter data is to be generated, at least in part, by the at least one device driver associated with the network interface controller circuitry.

* * * * *